United States Patent
Dawson

[15] 3,685,079
[45] Aug. 22, 1972

[54] VEHICLE WASHING SYSTEM
[72] Inventor: Jack S. Dawson, Grand Rapids, Ohio
[73] Assignee: Dawson-Yager, Inc., Toledo, Ohio
[22] Filed: June 22, 1970
[21] Appl. No.: 48,074

[52] U.S. Cl.................15/21 D, 104/44, 214/16.1 A
[51] Int. Cl..............................................B60s 3/06
[58] Field of Search......15/DIG. 2, 21 R, 21 D, 21 E, 15/97; 104/35, 44, 45, 48; 214/16.1 A

[56] References Cited

UNITED STATES PATENTS

| 1,782,671 | 11/1930 | Allred, Jr. | 214/16.1 A UX |
| 3,566,798 | 2/1971 | Pietzman | 104/44 |
| 1,713,014 | 5/1929 | Wilde et al. | 104/44 |
| 1,838,823 | 12/1931 | Gillespie | 104/44 |
| 1,858,438 | 5/1932 | Dunn | 104/44 |
| 3,255,899 | 6/1966 | Mengel | 104/44 X |
| 3,332,098 | 7/1967 | Smith | 15/21 D |
| 3,362,349 | 1/1968 | Kirkland | 104/44 |
| 3,418,943 | 12/1968 | Teters | 104/45 X |
| 3,451,085 | 6/1969 | Hay | 15/21 D |
| 3,497,894 | 3/1970 | Oldham | 15/21 D |

Primary Examiner—Edward L. Roberts
Attorney—Wilson & Fraser

[57] ABSTRACT

In the conversion of existing buildings into facilities for washing vehicles, a conveyor within the building is associated with a turn-table at either the inlet or exit of the washing bay within the building where the vehicle turning space is insufficient to accommodate the normal turning radii of conventional vehicles.

9 Claims, 7 Drawing Figures

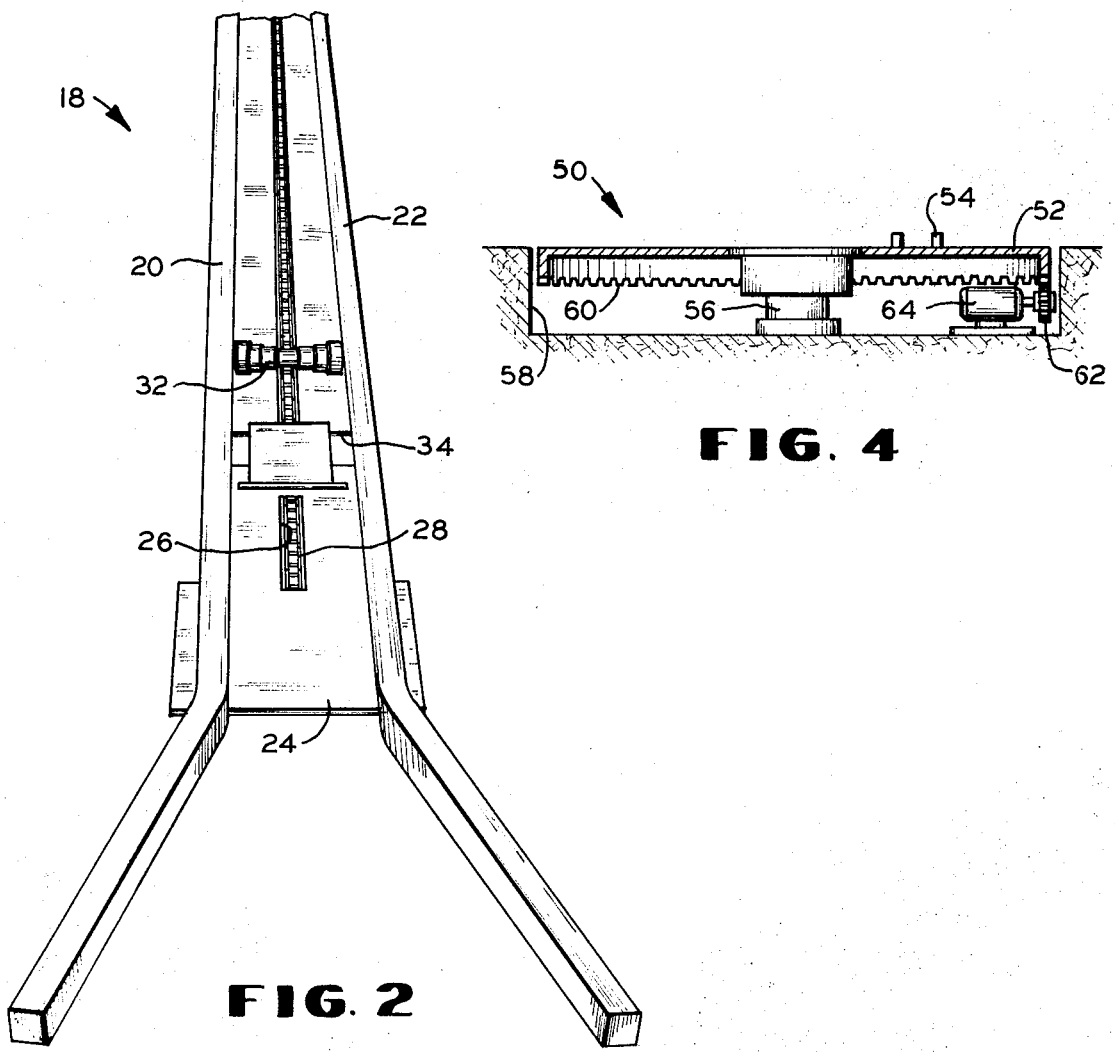
FIG. 2
FIG. 4
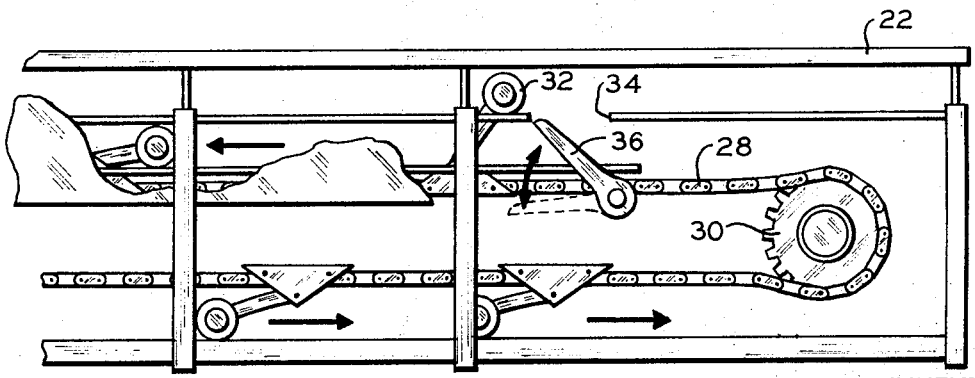
FIG. 3
INVENTOR.
JACK S. DAWSON
BY
Wilson & Fraser
ATTORNEYS

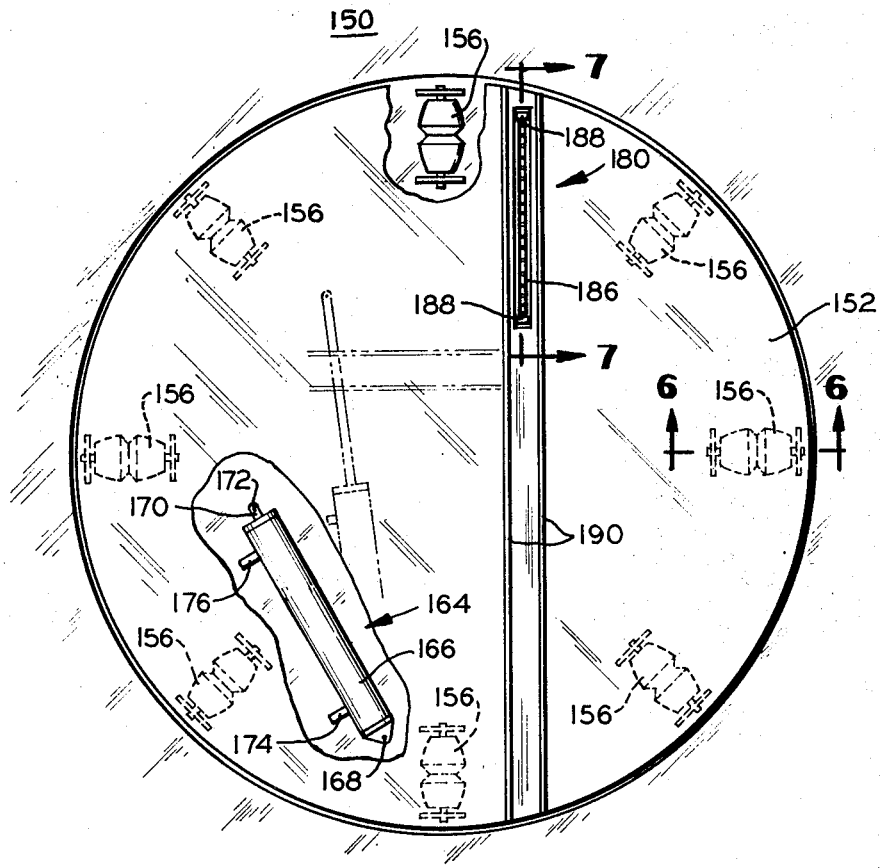
FIG. 5
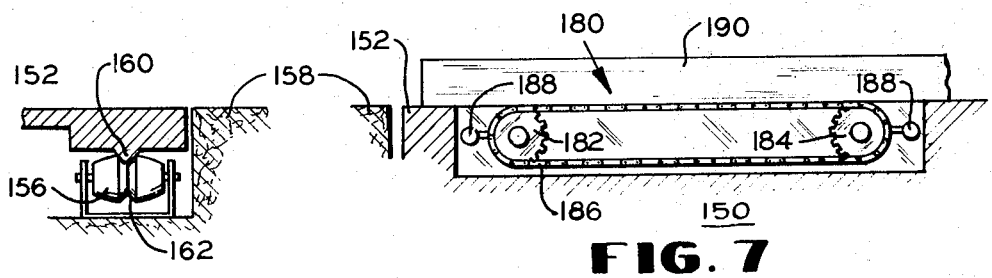
FIG. 6
FIG. 7
INVENTOR.
JACK S. DAWSON
BY
Wilson & Fraser
ATTORNEYS

VEHICLE WASHING SYSTEM

BACKGROUND OF THE INVENTION

The invention is concerned primarily with vehicle washing apparatus which may be utilized in a system wherein the available space is insufficient to permit a vehicle under its own turning capabilities to effect the substantially ninety degree turn at either the inlet or the outlet thereto.

In the recent past, many attempts have been made toward developing vehicle wash components which cooperate together to form a continuous vehicle washing system with the elimination of manual or hand work. While the components may be usefully employed in specially constructed building, they have been found to be particularly advantageously utilized in existing structures which obviously results in a lower overall cost factor to the investor. One of the excellent sites of existing buildings for use as a vehicle washing system is the multibay gasoline station. However, many such sites have to be rejected because the rear of the building is so close to the adjacent property line that there is not enough space to permit a vehicle to turn into the bays which would contain the various vehicle washing components.

It is an object of the present invention to produce a vehicle washing system which can be utilized in converting the use of existing buildings.

Still another object of the invention is to produce a vehicle washing system employing a turntable mechanism for turning a vehicle being washed from one direction of travel to another in alignment with at least a portion of the washing components.

SUMMARY

The above objects, as well as others, may be achieved by a vehicle washing system which includes a plurality of spaced apart aligned vehicle washing, brushing, and drying stations; means for directing a series of vehicles sequentially through the stations; and turntable means for effectively selectively rotating the vehicles relative to alignment with the vehicle directing means.

BRIEF DESCRIPTION OF THE DRAWINGS

Other objects and advantages of the invention will become readily apparent to one skilled in the art from reading the following detailed description of an embodiment of the invention when considered in the light of the accompanying drawings, in which:

FIG. 2 is a perspective view of the automatic conveyor system;

FIG. 3 is a sectional view of the conveyor system illustrated in FIG. 2;

FIG. 4 is a sectional view of the turntable apparatus illustrated in FIG. 1 taken along line 4—4 thereof;

FIG. 5 is a top plan view of a modified form of the turntable mechanism with portions broken away to more clearly illustrate the structure;

FIG. 6 is a fragmentary sectional view of the turntable supporting mechanism taken along line 6—6 of FIG. 5; and FIG. 7 is a fragmentary sectional view of auxiliary conveying mechanism on the turntable platform taken along line 7—7 of FIG. 5.

DESCRIPTION OF THE PREFERRED EMBODIMENT

Figure 1:
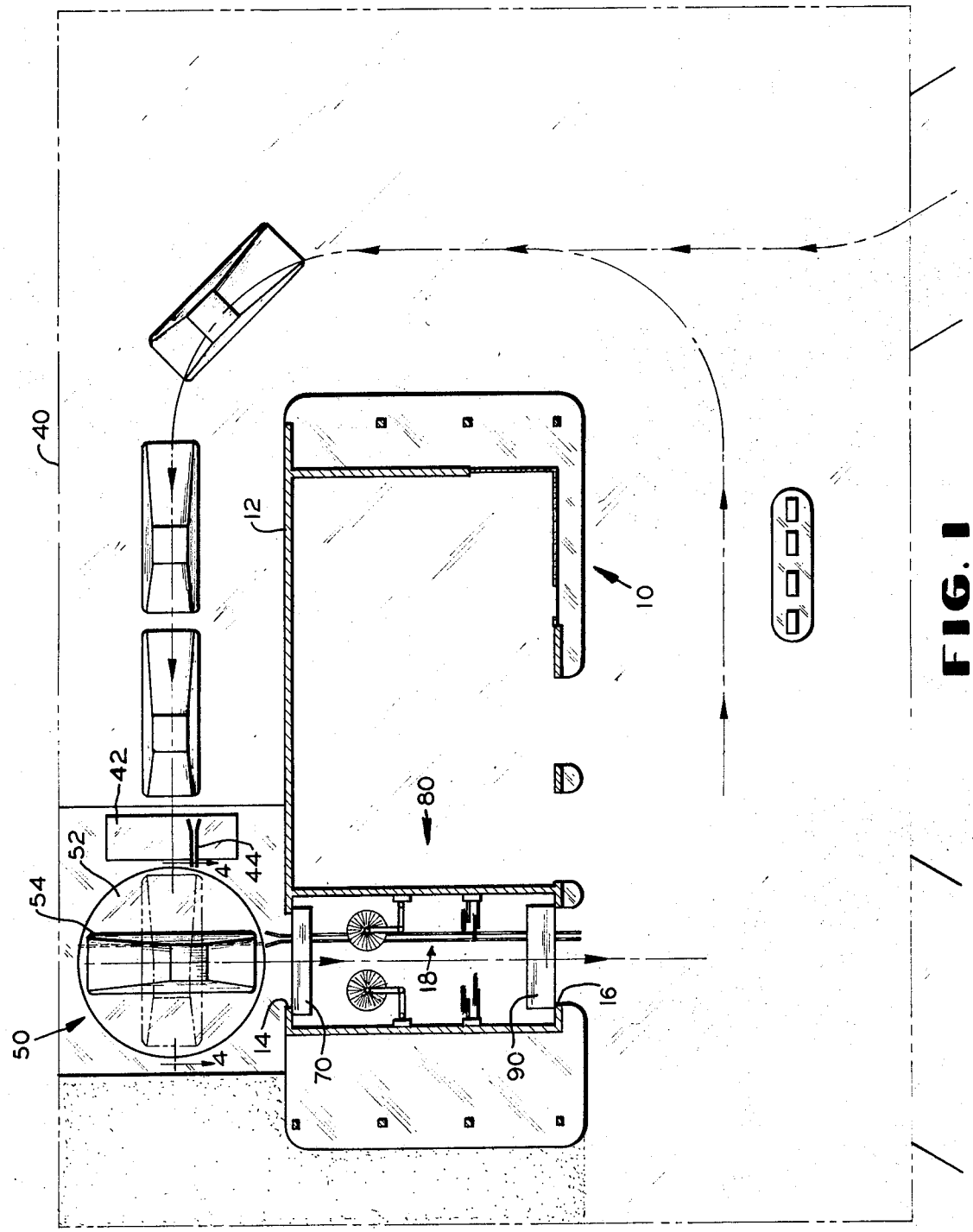
FIG. 1 is a top plan view, partially in section, illustrating a vehicle washing system constructed in accordance with the present invention.

Referring to the drawings and particularly to FIG. 1, there is shown a continuous vehicle washing system including a plurality of spaced apart cooperating vehicle washing stations which have been installed in an existing structure 10 such as a building originally constructed as a gasoline service station. The rear wall 12 of the structure 10 is provided with an opening 14 providing an inlet and a front wall with providing an outlet. The conveyor 18, which is installed in the floor of the structure 10, is adapted to extend between the inlet opening 14 and the outlet opening 16.

The conveyor 18 may typically be comprised of a pair of spaced apart rails 20 and 22 which effectively guide a front and corresponding rear wheel of a vehicle being conveyed through the washing system.

A cover plate 24 is disposed between the rails 20 and 22 extending substantially the entire length of the rails and is further provided with a centrally disposed longitudinally extending slot 26. An endless chain 28 is disposed beneath the plate 24 in such a fashion that the upper flight of the chain 28 is directed by a driven sprocket 30 to travel in close proximity to the longitudinal slot 26. A plurality of spaced tire engaging rollers 32 is carried by the chain 28 and selective ones thereof may be raised through a transversely extending slot 34 in the plate 24 by a lifting arm 36 which is manually or automatically energized only upon the occurrence or presence of a vehicle to be washed. Accordingly, the rollers 32 are exposed only on demand.

The normal ingress to the rear of the building structure 10 is illustrated rather diagrammatically by the series of arrows and top view of vehicles in FIG. 1. As the vehicle to be washed traverses the zone between the rear wall 12 of the building 10 and the adjacent property line 40, it reaches a correlator device 42 which contains a pair of wheel aligning rails 44 which are effective to properly guide and thereby align the front wheels of a vehicle entering the system.

It will be noted at this point that since the zone between the rear wall 12 and the adjacent property line 40 is typically of the order of approximately twenty four feet, there is insufficient space for the vehicle to effect the desired turn and enter the rear opening 14 of the building 10. To overcome this problem, there is provided a turntable mechanism 50 consisting of a main platform 52 containing, on the upper surface thereof, a pair of spaced apart rails 54 which are in general alignment with the rails 44 of the correlator 52 when the turntable arrangement 50 is in the position illustrated in phantom in FIG. 1. Also, it will be noted that when the turntable mechanism 50 is in the full line position illustrated in FIG. 1, the rails 54 are in general alignment with the rails 20 and 22 of the conveyor 18.

While the turntable mechanism 50 may be of many differing forms, satisfactory results can be achieved by rotatably supporting the main platform 52 on a central rotatable support 56 disposed in a pit 58 as illustrated in FIG. 4. The main platform 52 is provided with depending gear teeth 60 which are drivingly engaged by a pinion 62 of an electrically energized drive motor 64. Typically, upon energization, the drive motor 64 is operable to selectively rotate the main platform 52 through a ninety degree quadrant so that at one of its limits, the rails 54 are in alignment with the rails 44 of the correlator 42, and at the other limit, in alignment with the rails 20 and 22 of the conveyor 18. Thus, it will be appreciated that a vehicle may be rotated through ninety degrees within a space slightly wider than the length of the vehicle and thereby position the vehicle in alignment with the conveyor 18.

Upon entry of the vehicle onto the conveyor 18, a roller 32 is urged upwardly through the slot 34 by the lifting arm 36. When the roller 32 is in its raised position, it engages one of the tires of the vehicle to be washed and effectively conveys the same through the remaining portion of the system. The roller 32 functions to push the vehicle through the vehicle washing system by either the front or rear tire. The remaining portion of the system includes a soaper station 70 which applies a mixture of detergent and water on the outer surface of the vehicle to loosen dirt and grime; a wrap around brush assembly 80; and a dryer assembly 90.

Typically, the soaper station 70 consists of a series of spaced apart nozzles which effectively direct jets of water and detergent onto the outer surface of a vehicle being washed. The water and detergent effectively tends to loosen the dirt and grime which has collected on the front, side, top, and rear panels of the vehicle.

The brush assembly 80 typically includes rotating brushes for brushing the already wetted and soaped outer surfaces of the vehicle being washed. While different brush arrangements may be utilized, it has been found that, in its simplest form, the assembly includes a brush arrangement for brushing each side of the vehicle as well as the front and rear panels. Another brush arrangement is employed for effectively brushing the outside surfaces of the windows.

Finally, after the dirt and grime has been removed from the outer surface of the vehicle, the dryer assembly 90 is provided to effectively remove substantially all of the moisture from the outer surface of the vehicle just prior to emerging from the washing system. The dryer assembly 90 typically includes an overhead vehicle follower nozzle which closely follows the vehicle contour and removes water with air velocity reaching 250 miles per hours. The velocity of the air creates a 35 degree temperature rise to aid in the water removal. After the vehicle passes through the system, only a minimum of hand or manual touch up os required to completely dry the outer surface.

While reference has been made throughout the above description to a demand type conveyor system for transporting the vehicles through the various vehicle treating stations of the system, it will be appreciated that a more economical conveying system could be utilized without avoiding the scope of the invention. Such other conveying system could be of the type in which all of the operative components are disposed above or at ground level and would be generally of the type which employ front tire engaging means normally operative to engage the front tires of the vehicle at the exit end of the turntable mechanism 50.

Another embodiment of the turntable mechanism is illustrated in FIGS. 5, 6 and 7 wherein there is a turntable mechanism generally illustrated by reference numeral 150 including a main platform 152 supported by a plurality of rollers 156 disposed in a pit 158. The main platform 152 is provided with a depending annular centering track 160 which is adapted to be received within and guided by a corresponding groove 162 formed in the rollers 156. The co-action between the track 160 and the groove 162 function to maintain the desired alignment or position of the turntable within the pit 158.

The desired rotation of the main platform 152 of the turntable mechanism 150 is effected by a pressure fluid actuated motor 164 which is pivotally interconnected between a fixed point within the pit 158 and the platform 152. The main housing or cylinder 166 of the fluid motor 164 can be pivotally affixed relative to the floor of the pit 158 as at 168, while the distal end of piston rod 170 can be pivotally affixed to the undersurface of the platform 152 as at 172. Accordingly, when pressure fluid is introduced into the motor 164 through the inlet 174, the piston rod 170 is moved to the position illustrated in dotted lines in FIG. 5, and thereby effects the desired rotation of the turntable mechanism. The reverse rotation can then be effected by introducing pressure fluid into the inlet 176 and venting the inlet 174.

In certain instances, it may be desirable to provide auxiliary means for effecting the movement of the vehicle onto or off from the turntable mechanism 150. To achieve such an objective, a separate conveyor 180 may be provided as illustrated in FIG. 7. The conveyor 180 typically consists of a pair of spaced sprockets 182 and 184, one of which may be driven, and a chain 186 driven thereby. The chain 186 carries a number of tire engaging rollers 188 adapted to engage either the front or the rear tires of the vehicle on the turntable platform. The rollers 188 are adapted to travel the distance of the spacing of the sprockets 182 and 184 between the spaced apart guide rails 190.

The sprockets 182 and 184 may be driven by any suitable means such as, for example, an electric motor.

It will be appreciated that the above described systems enable the conversion of many sites with limited space requirements into useful vehicle washing systems by the utilization of the combination of a plurality of spaced vehicle washing units with a means for rotating a vehicle about a vertical axis. While the illustrated and described system is directed to a vehicle washing system utilizing a vehicle turning means at the inlet end thereof, it will be appreciated that the vehicle travel and associated washing stations could be reversed. In such a system, the vehicle turning means would be located at the outlet end thereof.

Further, specific mention has been made of the use of an automatic means for conveying the vehicles through the system; however, it must be understood that satisfactory results can likewise be achieved in a system where the vehicle being washed travels through the system under its own motive power.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

I claim:

1. A vehicle washing system comprising:

a plurality of spaced apart vehicle washing stations located within a building having spaced apart access openings;

means for directing vehicles sequentially through said stations by passing the vehicles into one of said openings and out of another of said openings; and turntable means for selectively rotating the vehicles, said turntable means being in generally concentric alignment with said directing means, said turntable including conveying means for moving the vehicles relative to said turntable.

2. A vehicle washing system as defined in claim 1 wherein said means for directing vehicles sequentially through said stations includes a means for automatically conveying the vehicles along a predetermined path.

3. A vehicle washing system as defined in claim 1 wherein said turntable is selectively energized to rotate about a vertical axis.

4. A vehicle washing system as defined in claim 3 including an electrically energized reversible motor for rotating said turntable.

5. A vehicle washing system as defined in claim 3 including a pressure fluid actuated motor for rotating said turntable.

6. A vehicle washing system as defined in claim 3 wherein said turntable is supported by a plurality of annularly disposed roller members.

7. A vehicle washing system as defined in claim 6 wherein said turntable includes a depending annular track, and said roller members are grooved to receive said annular track.

8. A vehicle washing system as defined in claim 1 wherein said conveying means includes an endless conveyor.

9. A vehicle washing system as defined in claim 1 wherein said conveying means includes roller means for engaging tires of the vehicles.

* * * * *